(12) United States Patent
Kim et al.

(10) Patent No.: US 9,102,239 B2
(45) Date of Patent: Aug. 11, 2015

(54) TRAIN SPEED MEASURING DEVICE AND METHOD

(71) Applicant: LSIS CO., LTD., Anyang-si, Gyeonggi-do (KR)

(72) Inventors: Seok Heon Kim, Seoul (KR); Jae Mun Han, Hwaseong-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/653,334

(22) Filed: Oct. 16, 2012

(65) Prior Publication Data
US 2013/0103225 A1    Apr. 25, 2013

(30) Foreign Application Priority Data
Oct. 19, 2011    (KR) .......................... 10-2011-0107128

(51) Int. Cl.
*G06F 5/00* (2006.01)
*G06F 17/00* (2006.01)
*B60L 3/12* (2006.01)
(Continued)

(52) U.S. Cl.
CPC ... *B60L 3/12* (2013.01); *B60L 3/08* (2013.01); *B60L 3/102* (2013.01); *B60L 11/02* (2013.01); *G01P 3/56* (2013.01); *G01P 11/00* (2013.01); *B60L 2200/26* (2013.01);
(Continued)

(58) Field of Classification Search
CPC ............. B60L 3/08; B60L 3/12; B60L 3/102; B60L 11/02; B60L 2240/12; B60L 2240/461; B60L 2240/465; B60L 2200/26; G01P 3/56; G01P 11/00; Y02T 10/70

USPC .............................................. 701/1
See application file for complete search history.

(56) References Cited

U.S. PATENT DOCUMENTS 3,728,596 A * 4/1973 Hermansson et al. .......... 318/52
3,731,088 A * 5/1973 Grundy et al. ............ 246/182 B
(Continued)

FOREIGN PATENT DOCUMENTS

CN    1166420    12/1997
CN    101644568    2/2010
(Continued)

OTHER PUBLICATIONS

Saab, S. S., "Compensation of Axle-Generator Errors Due to Wheel Slip and Slide," IEEE Transactions on Vehicular Technology, vol. 51, No. 3, May 2002, pp. 577-587.*
(Continued)

*Primary Examiner* — Yonel Beaulieu
*Assistant Examiner* — Krishnan Ramesh
(74) *Attorney, Agent, or Firm* — Lee, Hong, Degerman, Kang & Waimey

(57) ABSTRACT

Provided are a train speed measuring device and method. The train speed measuring device includes: at least one first tachometer disposed at an axle of a trailer car and for outputting a pulse signal according to a wheel revolution of the trailer car; at least one second tachometer disposed at an axle of a motor car and for outputting a pulse signal according to a wheel revolution of the motor car; at least one speed measuring unit for measuring speed values on the basis of pulse signals outputted from the at least one first tachometer and the at least one second tachometer; and a speed calculating unit for calculating the speed of the train on the basis of the measured speed values.

14 Claims, 5 Drawing Sheets

(51) Int. Cl.
  *B60L 3/08*   (2006.01)
  *G01P 3/56*   (2006.01)
  *G01P 11/00*  (2006.01)
  *B60L 3/10*   (2006.01)
  *B60L 11/02*  (2006.01)

(52) U.S. Cl.
  CPC ....... *B60L 2240/12* (2013.01); *B60L 2240/461* (2013.01); *B60L 2240/465* (2013.01); *Y02T 10/70* (2013.01)

(56) References Cited

U.S. PATENT DOCUMENTS

| | | | |
|---|---|---|---|
| 4,005,837 A * | 2/1977 | Grundy | 246/182 B |
| 4,006,417 A * | 2/1977 | Pace | 324/166 |
| 4,065,975 A * | 1/1978 | Giessner | 73/510 |
| 4,217,643 A * | 8/1980 | Anderson et al. | 701/20 |
| 4,257,005 A * | 3/1981 | Hall | 324/166 |
| 4,347,569 A * | 8/1982 | Allen et al. | 701/82 |
| 4,410,154 A * | 10/1983 | Matty | 246/182 B |
| 4,418,301 A * | 11/1983 | Griffith | 318/59 |
| 4,710,880 A * | 12/1987 | Zuber | 701/20 |
| 4,896,090 A * | 1/1990 | Balch et al. | 318/52 |
| 4,932,726 A * | 6/1990 | Iwata et al. | 303/193 |
| 4,950,964 A * | 8/1990 | Evans | 318/52 |
| 4,972,145 A * | 11/1990 | Wood et al. | 324/160 |
| 4,977,525 A * | 12/1990 | Blackwell | 702/146 |
| 5,212,640 A * | 5/1993 | Matsuda | 701/29.2 |
| 5,290,095 A * | 3/1994 | Wood et al. | 303/133 |
| 5,305,693 A * | 4/1994 | Johnson et al. | 104/299 |
| 5,436,538 A * | 7/1995 | Garvey et al. | 318/52 |
| 5,453,942 A * | 9/1995 | Wood et al. | 702/148 |
| 5,629,567 A * | 5/1997 | Kumar | 290/3 |
| 5,685,507 A * | 11/1997 | Horst et al. | 246/187 A |
| 5,803,411 A * | 9/1998 | Ackerman et al. | 246/169 R |
| 5,852,330 A * | 12/1998 | Yumoto | 290/40 R |
| 5,947,423 A * | 9/1999 | Clifton et al. | 246/62 |
| 6,028,402 A * | 2/2000 | Kumar et al. | 318/52 |
| 6,152,546 A * | 11/2000 | Daigle | 303/151 |
| 6,246,316 B1 | 6/2001 | Andsager | 340/444 |
| 6,499,815 B1 * | 12/2002 | Daigle | 303/151 |
| 6,539,293 B2 * | 3/2003 | Bachtiger et al. | 701/20 |
| 6,718,249 B2 * | 4/2004 | Herb et al. | 701/90 |
| 6,758,087 B2 * | 7/2004 | Balch et al. | 73/115.08 |
| 6,970,774 B2 * | 11/2005 | Kane et al. | 701/19 |
| 7,467,830 B2 * | 12/2008 | Donnelly | 303/139 |
| 7,917,257 B2 * | 3/2011 | Kumar | 701/19 |
| 7,953,425 B2 * | 5/2011 | Jordan | 455/466 |
| 7,966,126 B2 * | 6/2011 | Willis et al. | 701/412 |
| 8,229,607 B2 * | 7/2012 | Hrdlicka et al. | 701/20 |
| 8,280,569 B2 * | 10/2012 | Kumar et al. | 701/20 |
| 8,296,065 B2 * | 10/2012 | Haynie et al. | 701/505 |
| 8,423,234 B2 * | 4/2013 | Maire | 701/31.4 |
| 8,554,397 B1 * | 10/2013 | Nishinaga et al. | 701/19 |
| 2001/0035049 A1 * | 11/2001 | Balch et al. | 73/488 |
| 2004/0006411 A1 * | 1/2004 | Kane et al. | 701/1 |
| 2004/0140405 A1 * | 7/2004 | Meyer | 246/122 R |
| 2005/0137761 A1 * | 6/2005 | Lungu | 701/20 |
| 2006/0265127 A1 * | 11/2006 | Qu | 701/213 |
| 2008/0051967 A1 * | 2/2008 | Tarnow et al. | 701/71 |
| 2008/0065305 A1 * | 3/2008 | Hattori et al. | 701/70 |
| 2009/0138199 A1 * | 5/2009 | Bonanni et al. | 701/214 |
| 2010/0324776 A1 * | 12/2010 | Maire | 701/33 |

FOREIGN PATENT DOCUMENTS

| | | |
|---|---|---|
| JP | 63-262003 | 10/1988 |
| JP | 02-095101 | 4/1990 |

OTHER PUBLICATIONS

P. Liljas, "Speed and Positioning Systems. The Traditional Way", IEE Colloquium on Where Are We Going? (and How Fast!), Seminar Exploring Speed and Positioning Systems for the Transport Sector (1997/395), London, p. 2/1-2/9, Nov. 6, 1997, INSPEC 5816345.*

Doh-Young Park et al., "Hybrid re-adhesion control method for traction system of high-speed railway" Procd. Of 5th Intl Conf on Electrical Machines and Systems, ICEMS, Aug. 2001, vol. 2, pp. 739-742, IEEE.*

The State Intellectual Property Office of the People's Republic of China Application Serial No. 201210387255.9, Office Action dated Mar. 13, 2014, 9 pages.

Saab, et al., "Compensation of Axle-Generator Errors Due to Wheel Slip and Slide," IEEE Transactions on Vehicular Technology, vol. 51, No. 3, May 2002, pp. 577-587.

Liljas, "Speed and Positioning Systems, The Traditional Way," IEEE Colloquium on Where Are We Going? (and How Fast!) Seminar Exploring Speed and Positioning System for the Transport Sector, Dec. 1997, 9 pages.

Taiwan Intellectual Property Office Application Serial No. 101134753, Office Action dated Jul. 30, 2014, 5 pages.

* cited by examiner

TRAIN SPEED MEASURING DEVICE AND METHOD

CROSS-REFERENCE TO RELATED APPLICATIONS

Pursuant to 35 U.S.C. §119(a), this application claims the benefit of earlier filing date and right of priority to Korean Patent Application No. 10-2011-0107128, filed on Oct. 19, 2011, the contents of which are hereby incorporated by reference herein in its entirety.

BACKGROUND

The present invention relates to a train speed measuring device and method, and more particularly, to a train speed measuring device installed at a train and a train speed measuring method using the same.

In general, one of important functions of a train speed measuring device for a railway vehicle is to apply a brake on and protect a vehicle when the vehicle exceeds the maximum driving speed allowed in a railway in order to evade a collision between the vehicle and a preceding vehicle.

Additionally, in the case of a train automatic operation, a train speed measuring device performs an operation such as brake and acceleration by using a difference between a vehicle's actual speed and a target speed at a vehicle's predetermined driving point. Also, the train speed measuring device calculates an accumulated travelling distance of a train through a measured speed and time value in order to obtain the position of the current train.

In order to perform such a function, an accurate speed calculation of a vehicle is indispensable to the train speed measuring device.

The train speed measuring device installed at a current railway vehicle and for obtaining the safety of a train includes a tachometer installed at a vehicle axle and calculates the train speed by using a speed pulse proportional to the revolution speed of an axle, which is measured from the tachometer according to the movement of the vehicle.

However, such a method may not calculate an accurate speed when abnormal situations such as slip and slide on an axle having a tachometer installed occur due to rainy weather or any other reason.

In more detail, when a slip phenomenon due to the idling of a wheel caused from moisture on a rail occurs, a faster speed than the actual speed of the vehicle is measured. Moreover, when a slide phenomenon due to axle locking caused from a product operation occurs during a train operation, a slower speed than the actual speed of the vehicle is measured. Such a difference between the actual speed and the measured speed of a vehicle may deteriorate the accuracy of exact stop during a vehicle's automatic operation. Additionally, this may be a risk element for overall safe driving.

Furthermore, a slip phenomenon may typically occur in a motor car having a mounted power source.

SUMMARY

Embodiments provide an accuracy-improved train speed measuring device and method.

Embodiments also provide a train speed measuring device and method, which resolve errors caused from a slip phenomenon of a motor car in order to reduce speed measurement errors.

In one embodiment, a train speed measuring device includes: at least one first tachometer disposed at an axle of a trailer car and for outputting a pulse signal according to a wheel revolution of the trailer car; at least one second tachometer disposed at an axle of a motor car and for outputting a pulse signal according to a wheel revolution of the motor car; at least one speed measuring unit for measuring speed values on the basis of pulse signals outputted from the at least one first tachometer and the at least one second tachometer; and a speed calculating unit for calculating the speed of the train on the basis of the measured speed values.

In another embodiment, a train speed measuring method includes: receiving a pulse signal according to a wheel revolution from at least one tachometer disposed at each axle of a motor car and a trailer car of a train; measuring a speed from the pulse signal and determining the speed of the motor car and the trailer car; and calculating the speed of the train on the basis of the determined speed of the motor car and the trailer car.

The details of one or more embodiments are set forth in the accompanying drawings and the description below. Other features will be apparent from the description and drawings, and from the claims.

DETAILED DESCRIPTION OF THE EMBODIMENTS

The terms and words used in the specification and claims should not be interpreted as conventional or dictionary meanings, and thus, should be interpreted as meanings and concepts corresponding to the technical idea of the present invention, on the basis of the principle that the inventor may appropriately define the concept of the terms in the best way in order to describe his/her own invention.

Accordingly, the invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
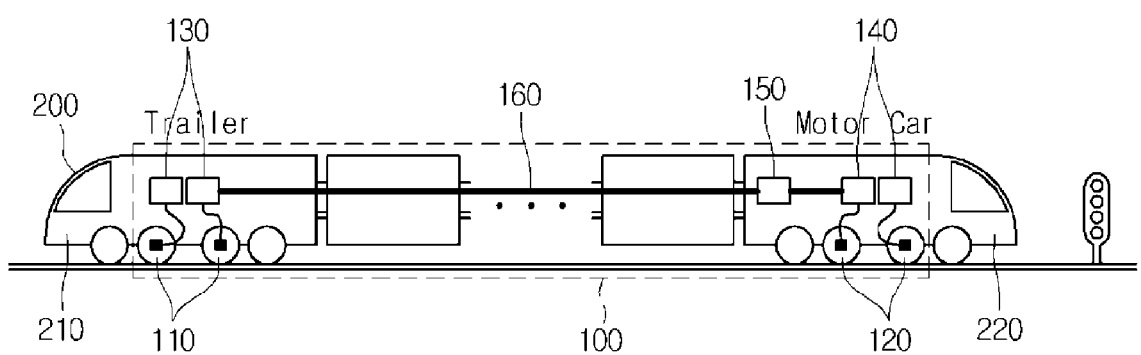
FIG. 1 is a schematic configuration view of a train including a train speed measuring device according to an embodiment.

FIG. 1 is a schematic configuration view of a train including a train speed measuring device according to an embodiment.

As shown in FIG. 1, the train 200 including the train speed measuring device 100 includes at least one first tachometer 110, at least one second tachometer 120, at least one first speed measuring unit 130, at least one second speed measuring unit 140, and a speed calculating unit 150.

The train 200 includes at least one trailer car 210 and at least one motor car 220, which are connected in series. The motor car 220 includes a power source of the train 200. The power source may be a diesel hydraulic type power source for delivering power by a gear or hydraulic pressure, or a diesel electrical type power source or electrical power source for delivering power by driving a generator via a diesel, according to an operation system of the train 200.

Moreover, at least one first tachometer 110 is installed at the axle of the trailer car 210 of the train 200 in order to measure the revolutions per hour of a wheel. The measured revolutions per hour of a wheel may be outputted as a pulse signal.

The first speed measuring unit 130 may be configured to correspond to each of at least one first tachometer. Additionally, one first speed measuring unit 130 may connect a plurality of first tachometers.

Moreover, at least one second tachometer 120 may be installed at the axle of the motor car 220 of the train 200 in order to measure the revolutions per hour of a wheel, and the measured revolutions per hour may be outputted as a pulse signal.

Also, the second speed measuring unit 140 may be configured to correspond to each of at least one second tachometer. Additionally, one second speed measuring unit 140 may connect a plurality of second tachometers.

The speed calculating unit 150 receives each speed from at least one first speed measuring unit 130 and at least one second speed measuring unit 140 through a series communication line 160, and calculates and outputs of the speed of the train 200 by using the received speed.

Figure 2:
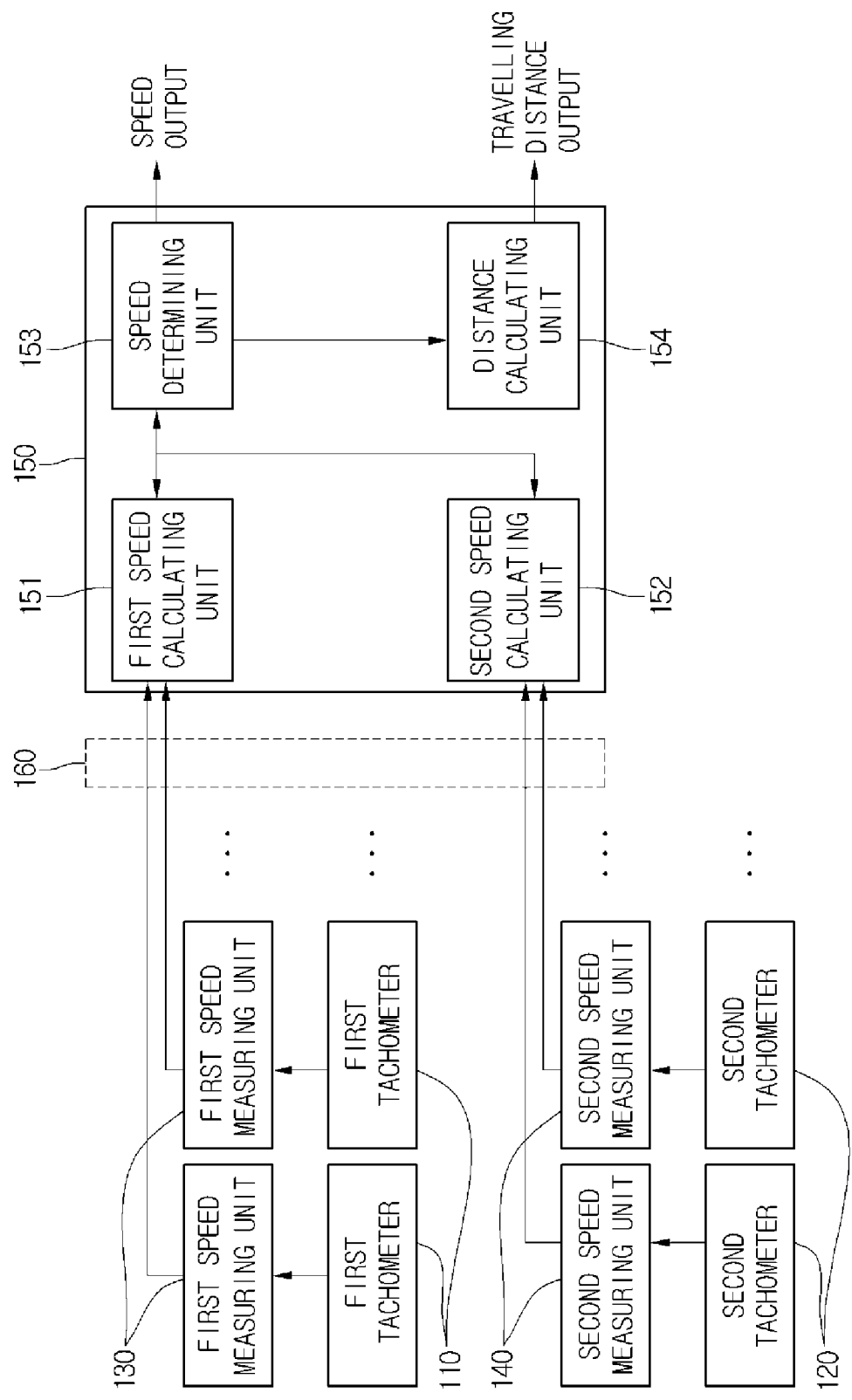
FIG. 2 is a block diagram of a train speed measuring device according to an embodiment.

FIG. 2 is a block diagram of a train speed measuring device 100 according to an embodiment.

Referring to FIG. 2, the train speed measuring device 100 includes at least one first tachometer 110, at least one second tachometer 120, at least one first speed measuring unit 130, at least one second speed measuring unit 140, and a speed calculating unit 150.

At least one first speed measuring unit 130 may receive a pulse signal from each corresponding first tachometer 110 in order to measure the speed and may transmit the measured speed to the first speed calculating unit 151 through the series communication line 160.

At least one second speed measuring unit 140 may receive a pulse signal from each corresponding second tachometer 120 in order to measure the speed and may transmit the measured speed to the second speed calculating unit 152 through the series communication line 160.

The first speed calculating unit 151 may calculate a first speed by using the received speeds from at least one first speed measuring unit 130. The first speed calculating unit 151 may select one of the received speeds from at least one first speed measuring unit 130 according to a predetermined condition in order to calculate a first speed. Or, the first speed calculating unit 151 may calculate a first speed by using an average value of the received speeds from at least one first speed measuring unit 130.

The second speed calculating unit 152 may calculate a second speed by using the received speeds from at least one second speed measuring unit 140. The second speed calculating unit 152 may select one of the received speeds from at least one second speed measuring unit 140 according to a predetermined condition in order to calculate a second speed. Or, the second speed calculating unit 152 may calculate a second speed by using an average value of the received speeds from at least one second speed measuring unit 140.

The speed determining unit 153 may receive one of the first speed and the second speed from the first speed calculating unit 151 and the second speed calculating unit 152 in order to determine the speed of the train 200 according to predetermined conditions described later, and then, may output the determined speed to the distance calculating unit 154 or the outside.

The distance calculating unit 154 may receive the speed of the train 200 from the speed measuring unit 153, and may calculate the distance that the train 200 travels on the basis of the received speed and travelling time. Once the travelling distance is calculated, the distance calculating unit 154 determines the travelling distance of the train 200 or the current position of the train 200 in order to output it to the external.

Figure 3:
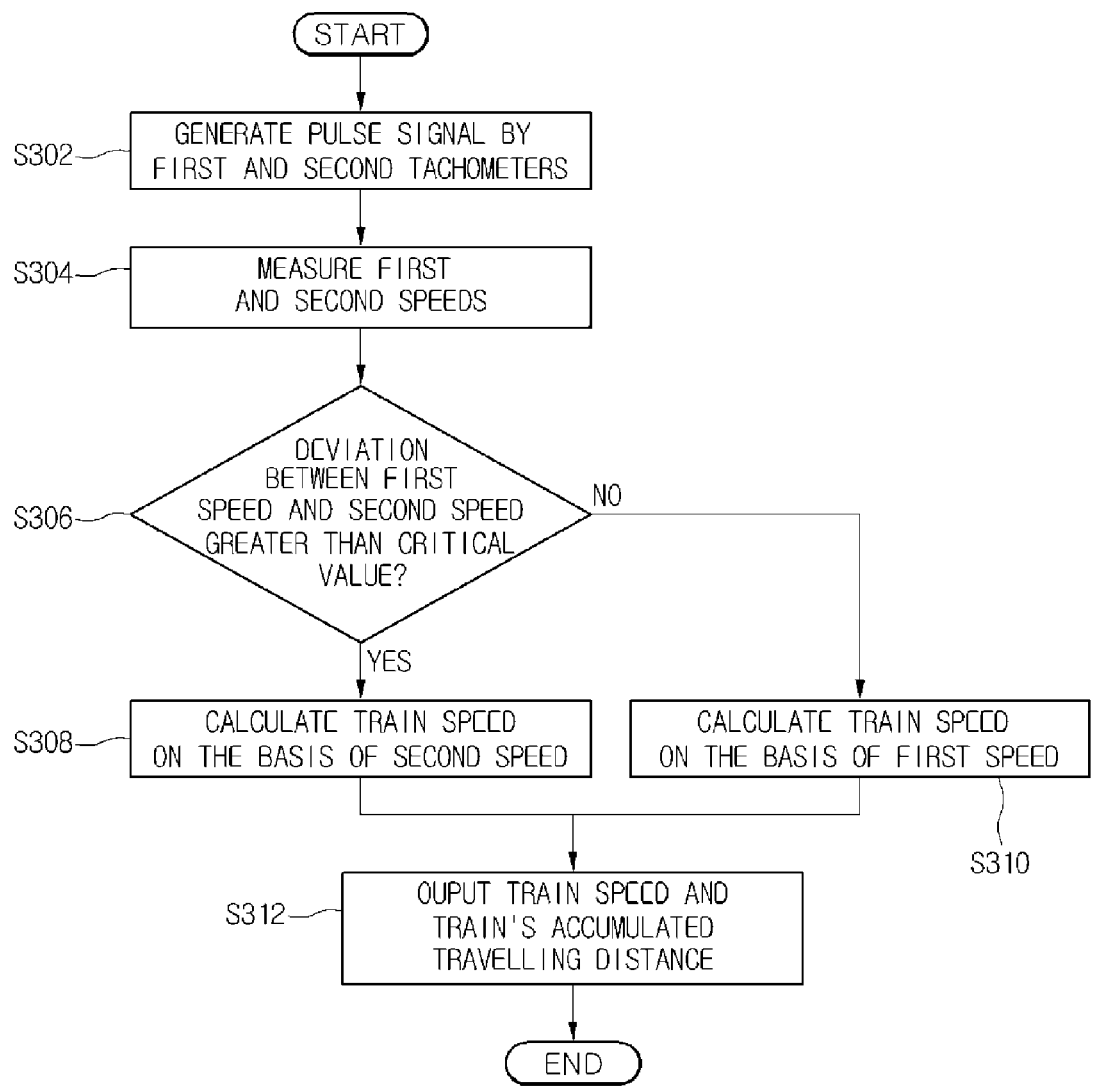
FIG. 3 is a flowchart illustrating a method of measuring a train speed according to an embodiment.

FIG. 3 is a flowchart illustrating a method of measuring a train speed according to an embodiment.

Referring to FIG. 3, at least one first and second tachometers 110 and 120 at the axles of the trailer car 210 and the motor car 220 of the train 200 may generate a pulse signal according to the revolutions per hour of a wheel in operation S302.

Furthermore, at least one first and second speed measuring units 130 and 140 may measure a first speed corresponding to the speed of the trailer car 210 and a second speed corresponding to the speed of the motor car 220 in operation S304. That is, the first and second speed measuring units 130 and 140 may receive a pulse signal from each corresponding tachometer in order to measure the speed.

The speed calculating unit 150 may receive speed values according to various communication methods. Also, the series communication line 160, which is easily installed at the train 200 and has high economic feasibility and compatibility, may be used.

Accordingly, according to embodiments, the series communication line 160 using an RS422 system is used as one example, but the present invention is not limited thereto. Also, an additional RS422 series communication terminal (not shown) for receiving a first speed may be further included in the speed calculating unit 150.

The speed calculating unit 150 receives a first speed and a second speed, and determines whether the deviation between the first and second speeds is greater than the critical value in operation S306. If the speed deviation is grater than the critical value, the speed calculating unit 150 calculates the speed of the train 200 on the basis of the first speed in operation S308. If the speed deviation is less than the critical value, the speed calculating unit 150 calculates the speed of the train 200 on the basis of the second speed in operation S310.

When performing a calculation operation on the basis of the first speed, the speed calculating unit 150 may measure an accurate speed without being affected by the speed determination of the train 200, even when a slip phenomenon occurs in the motor car 220.

Moreover, when performing a calculation operation on the basis of the second speed, the speed calculating unit 150 may obtain the speed of the motor car 220 in real time.

Accordingly, the speed calculating unit 150 determines that there is no slip phenomenon when the deviation between the first speed and the second speed is less than the critical value. Or, when the speed of the train 200 is calculated on the basis of the second speed and is greater than the critical value, the speed of the train 200 may be compensated on the basis of the first speed.

The critical value may be a numeral value that is used to determine whether a slip phenomenon occurs in the motor car 220. For example, the speed calculating unit 150 determines that there is a slip phenomenon when a difference between the first speed and the second speed is greater than approximately 15 km/h, so that the critical value is set to approximately 15 km/h.

The speed calculating unit 150 may output at least one of the accumulated travelling distance, current position, and current speed of the train 200 on the basis of the calculated speed of the train 200 in operation S312.

By using the outputted speed of the train 200, the train speed measuring device 100 confirms the current speed of the train 200 and determines whether the current speed is greater than the speed limit. Accordingly, with a linkage with another equipment, a brake applying function for preventing the collision with a preceding vehicle may be performed.

A train speed measuring device and method according to an embodiment compares the speed of the trailer car 210 with the speed of the motor car 220 in order to determine whether there is a slip phenomenon or a slide phenomenon. The speed of the train 200 is calculated according to the speed of the trailer car 210 such that the current speed of the train 200 may be accurately reflected.

Figure 4:
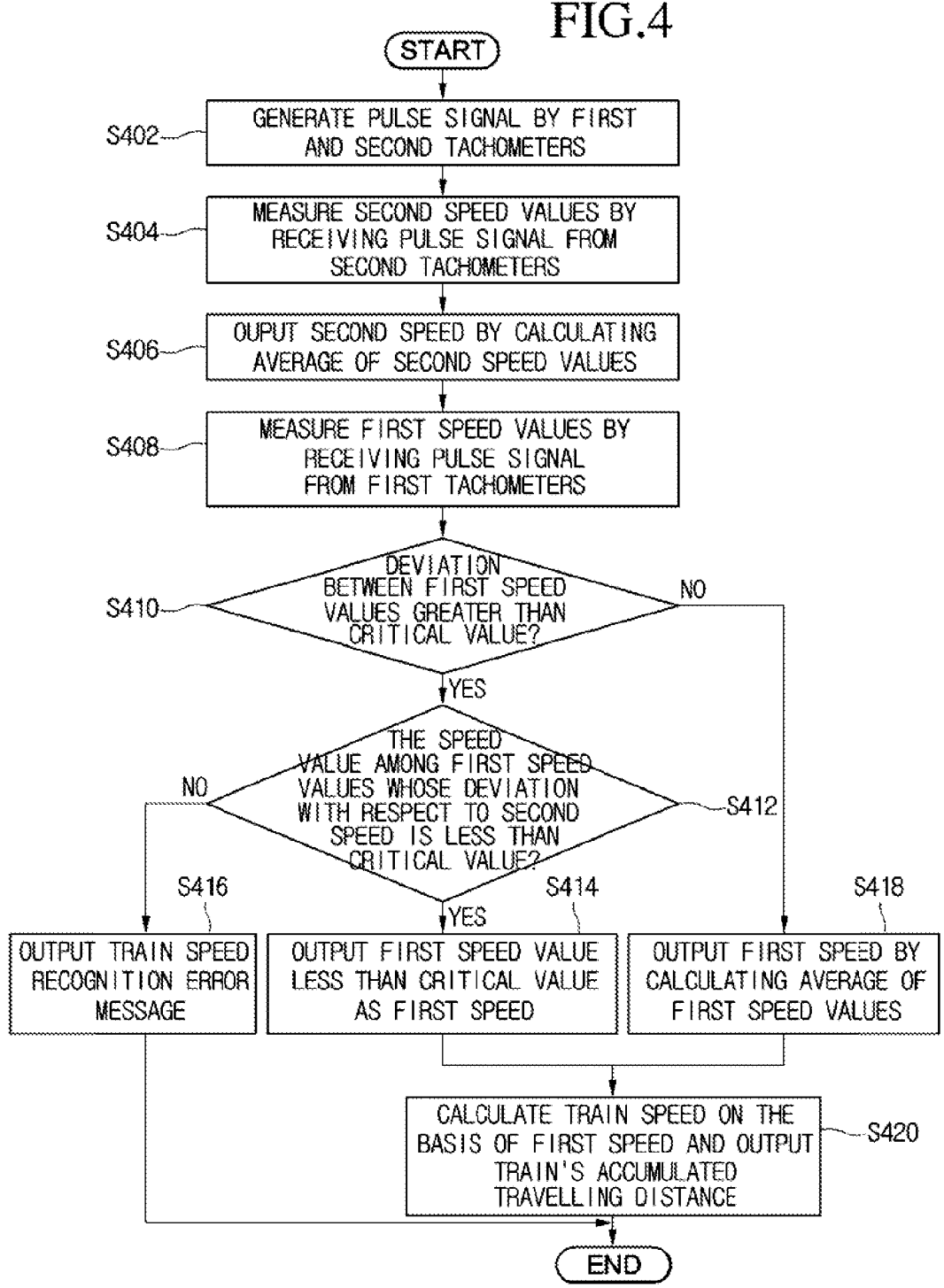
FIG. 4 is a flowchart illustrating a method of measuring a train speed according to another embodiment.

FIG. 4 is a flowchart illustrating a method of measuring a train speed according to another embodiment.

Referring to FIG. 4, at least one first and second tachometers 110 and 120 at the axles of the trailer car 210 and the motor car 220 of the train 200 may generate a pulse signal according to the revolutions per hour of a wheel in operation S402.

At least one second speed measuring unit 140 may receive a pulse signal from each corresponding second tachometer in order to measure second speed values in operation S404.

Then, a second speed calculating unit 152 receives the measured second speed value through the series communication line 160, and calculates an average value of the received second speed values in order to output it as a second speed in operation S406.

Moreover, at least one first speed measuring unit 130 may receive a pulse signal from each corresponding first tachometer in order to measure first speed values in operation S408.

Then, the first speed calculating unit 151 receives the measured first speed values through the series communication line 160, and determines whether the deviation between the received first speed values is greater than the critical value in operation S410.

The first speed calculating unit 151 calculates an average of the first speed values when the deviation between the first speed values is less than the critical value, and then, calculates a first speed in order to output it in operation S418.

Furthermore, when the deviation between the first speed values is greater than the critical value, the first speed calculating unit 151 determines that there is an issue on measuring the speed of at least one first tachometer 110, and determines whether there is a speed value among the first speed values, whose deviation with respect to the second speed, i.e. the speed of the motor car 220, is less than the critical value in operation S412.

Then, when there is a speed value among the first speed values, whose deviation with respect to the second speed is less than the critical value, the first speed calculating unit 151 selects the first speed value less than the critical value and outputs it as a first speed in operation S414.

Moreover, when there is no speed value among the first speed values, whose deviation with respect to the second speed is less than the critical value, the train speed measuring device 100 determines that there is an error in measuring the speed of the train 200 and outputs an error message relating to train speed recognition in operation S416.

Moreover, the speed determining unit 153 calculates and updates the speed of the train 200 on the basis of the first speed, in order to output the calculated speed of the train 200. Moreover, the distance calculating unit 154 may output information such as an accumulated travelling distance of the train 200 by using the calculated speed and time value of the train 200 in operation S420.

The first speed calculating unit 151 may determine whether speed values that at least one first tachometer measures are measured normally by comparing the deviation between the first speed values with the critical value, and may accurately calculate the speed of the trailer car 220.

Figure 5:
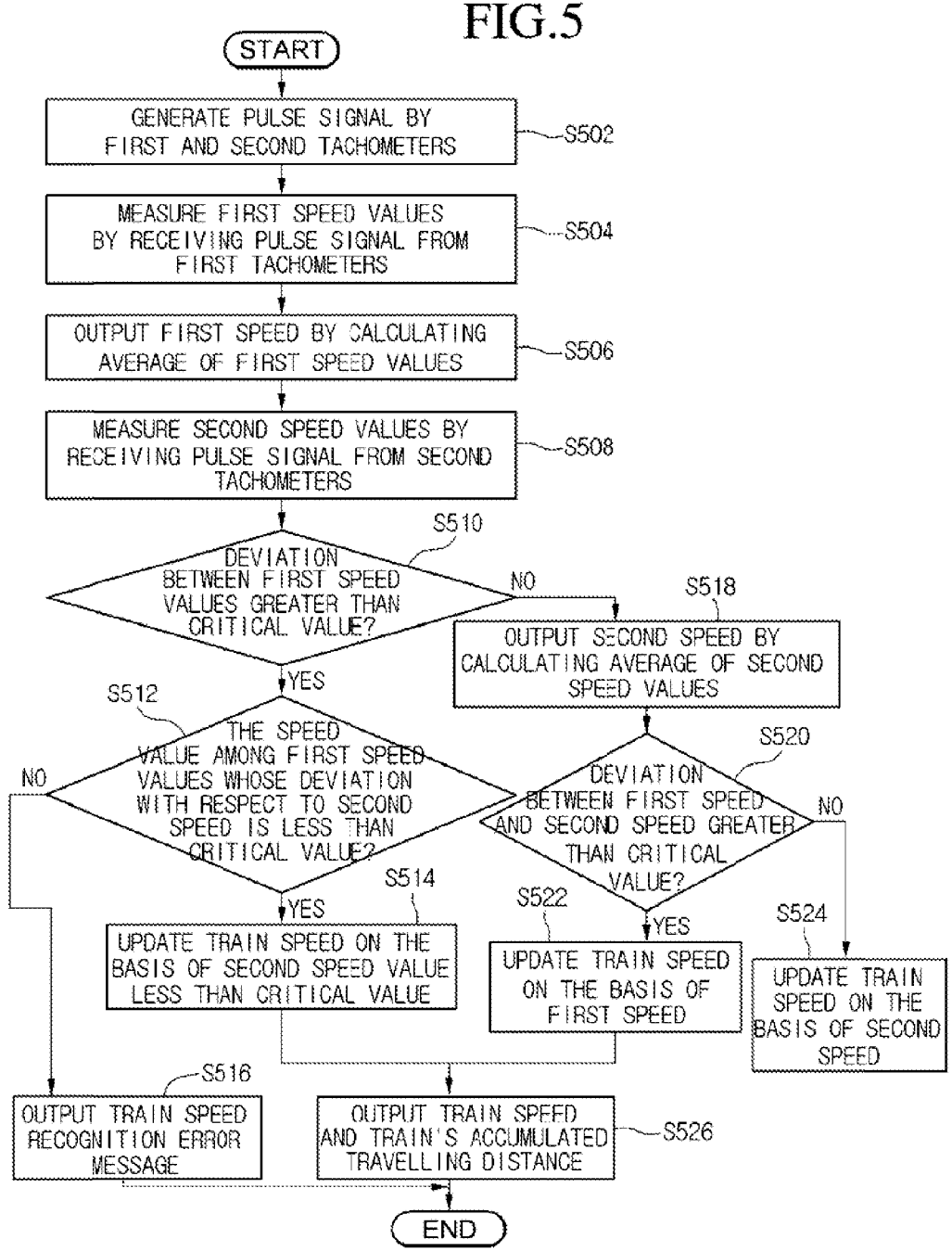
FIG. 5 is a flowchart illustrating a method of measuring a train speed according to another embodiment.

FIG. 5 is a flowchart illustrating a method of measuring a train speed according to another embodiment.

Referring to FIG. 5, at least one first and second tachometers 110 and 120 at the axles of the trailer car 210 and the motor car 220 of the train 200 may generate a pulse signal according to the revolutions per hour of a wheel in operation S502.

Moreover, at least one first speed measuring unit 140 may receive a pulse signal from each corresponding first tachometer in order to measure first speed values in operation S504.

Then, the first speed calculating unit 151 receives the measured first speed values through the series communication line 160, and calculates an average value of the received second speed values in order to output it as a first speed.

Moreover, at least one second speed measuring unit 140 may receive a pulse signal from each corresponding second tachometer in order to measure second speed values in operation S508.

Then, the second speed calculating unit 152 receives the measured second speed values through the series communication line 160, and determines whether the deviation between the received second speed values is greater than the critical value in operation S510.

The second speed calculating unit 152 calculates an average of the second speed values when the deviation between the second speed values is less than the critical value, and then, calculates a second speed in order to output it in operation S518.

The speed determining unit 153 determines whether the deviation between the first speed and the second speed is greater than the critical value.

The speed determining unit 153 determines that there is an issue on measuring the speed of the motor car 220 due to a slip phenomenon when the deviation between the first speed and the second speed value is greater than the critical value, and calculates and updates the speed of the train 200 on the basis of the first speed in operation S522.

Also, the speed determining unit 153 determines that there is no slip phenomenon when the deviation between the first speed and the second speed is less than the critical value, and calculates and updates the speed of the train 200 on the basis of the second speed, i.e. the speed of the motor car 220, in operation S524.

Furthermore, when the deviation between the first speed values is greater than the critical value, the first speed calculating unit 151 determines that there is an issue on measuring the speed of at least one first tachometer 110, and determines whether there is a speed value among the first speed values, whose deviation with respect to the second speed, i.e. the speed of the motor car 220, is less than the critical value in operation S512.

Then, when there is a speed value among the first speed values, whose deviation with respect to the second speed is less than the critical value, the first speed calculating unit 151 selects the first speed value less than the critical value and outputs it as a second speed, and the speed determining unit 153 calculates and updates the speed of the train 200 on the basis of the outputted second speed in operation S514.

Moreover, when there is no speed value among the first speed values, whose deviation with respect to the second speed is less than the critical value, the train speed measuring device 100 determines that there is an error in measuring the speed of the train 200 and outputs an error message relating to train speed recognition in operation S516.

Furthermore, the speed calculating unit 154 outputs the calculated or updated speed of the train 200. Moreover, the distance calculating unit 154 may output information such as an accumulated travelling distance of the train 200 by using the calculated speed and time value of the train 200 in operation S526.

The second speed calculating unit 152 may determine whether speed values that at least one second tachometer measures are measured normally by comparing a deviation between the second speed values with the critical value. Additionally, if it is determined that the speed values are not measured normally, the speed of the motor car 220 may be calculated with reference to the first speed, i.e. the speed of the trailer car 210.

Additionally, the speed of the train 200 may be accurately calculated through a method for calculating the speed of a train on the basis of a second speed, i.e. the speed of the motor car 220, determining whether there is a slip phenomenon by comparing the second speed with a first speed, and then correcting the speed. The method obtains the speed of the motor car 220 in real time, but when there is a slip phenomenon, measures the speed of the train 200 on the basis of the speed of the trailer car 210.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device for determining speed of a train, the device comprising:
   a plurality of first tachometers each located at an axle of a trailer car of the train and configured to output pulse signals according to a wheel revolution of the trailer car;
   a plurality of second tachometers each located at an axle of a motor car of the train and configured to output pulse signals according to a wheel revolution of the motor car;
   at least one first speed measuring unit configured to receive a first speed value from each of the plurality of first tachometers;
   at least one second speed measuring unit configured to receive a second speed value from each of the plurality of second tachometers;
   a first speed calculating unit configured to receive a plurality of first speed values from the at least one first speed measuring unit and to calculate an average value of the received plurality of first speed values in order to determine a first speed; and
   a second speed calculating unit configured to:
   receive a plurality of second speed values from the at least one second speed measuring unit;
   determine whether a deviation between the received plurality of second speed values is greater than a critical value; and
   determine the speed of the train based on the determined first speed when the determined deviation between the received plurality of second speed values is greater than the critical value.

2. The device according to claim 1, wherein the first speed calculating unit is further configured to:
   determine whether a deviation between the received plurality of first speed values is greater than the critical value; and
   determine a speed of the trailer car according to the calculated average value of the received plurality of first speed values when the determined deviation between the received plurality of first speed values is less than the critical value.

3. The device according to claim 2, wherein the first calculating unit is further configured to receive the plurality of determined first speed values via a series communication line between the motor car and the trailer car.

4. The device according to claim 1, wherein the second speed calculating unit is further configured to
   determine a speed of the motor car by comparing the received plurality of second speed values with a determined speed of the trailer car when the determined deviation between the received plurality of second speed values is greater than the critical value.

5. The device according to claim 4, wherein the second calculating unit is further configured to:
   calculate an average value of the received plurality of second speed values; and
   determine the speed of the motor car according to the calculated average value of the received plurality of second speed values when the determined deviation between the received plurality of second speed values is less than the critical value.

6. The device according to claim 4, wherein the second speed calculating unit is further configured to receive the plurality of second speed values via a series communication line between the motor car and the trailer car.

7. The device according to claim 1, further comprising a distance calculating unit configured to:
   receive the determined speed of the train from the second speed calculating unit; and
   determine a travelling distance of the train according to time based on the received determined speed of the train.

8. A method for determining speed of a train, the method comprising:
   receiving a first speed value according to a wheel revolution output from each of a plurality of first tachometers each located at each axle of a motor car of the train;
   receiving a second speed value according to a wheel revolution output from each of a plurality of second tachometers each located at each axle of a trailer car of the train;
   calculating an average value of a received plurality of first speed values in order to determine a first speed;
   determining whether a deviation between the received plurality of second first speed values is greater than a critical value; and
   determining the speed of the train based on the determined first speed when the determined deviation between the received plurality of second speed values is greater than the critical value.

9. The method according to claim 8, further comprising:
   determining whether a deviation between the received plurality of first speed values is greater than the critical value; and
   determining a speed of the trailer car according to the calculated average value of the received plurality of first speed values when the determined deviation between the received plurality of first speed values is less than the critical value.

10. The method according to claim 9, wherein the plurality of first speed values are received via a series communication line between the motor car and the trailer car.

11. The method according to claim 8, wherein determining the speed of the motor car comprises:
    receiving a plurality of determined second speed values; and
    comparing the plurality of determined second speed values with a determined speed of the trailer car when a deviation between the plurality of determined second speed values is greater than the critical value.

12. The method according to claim 11, further comprising:
    calculating an average value of the received plurality of second speed values; and
    determining a speed of the motor car according to the calculated average value of the received plurality of second speed values when the determined deviation between the received plurality of second speed values is less than the critical value.

13. The method according to claim 11, wherein the plurality of second speed values are received via a series communication line between the motor car and the trailer car.

14. The method according to claim 8, further comprising calculating a travelling distance of the train according to time based on the determined speed of the train.

* * * * *